No Printed Specification Ava
8396X
H. HANDSCHY.
BARLEY SHELLER.
Patented Sept. 5, 1834.
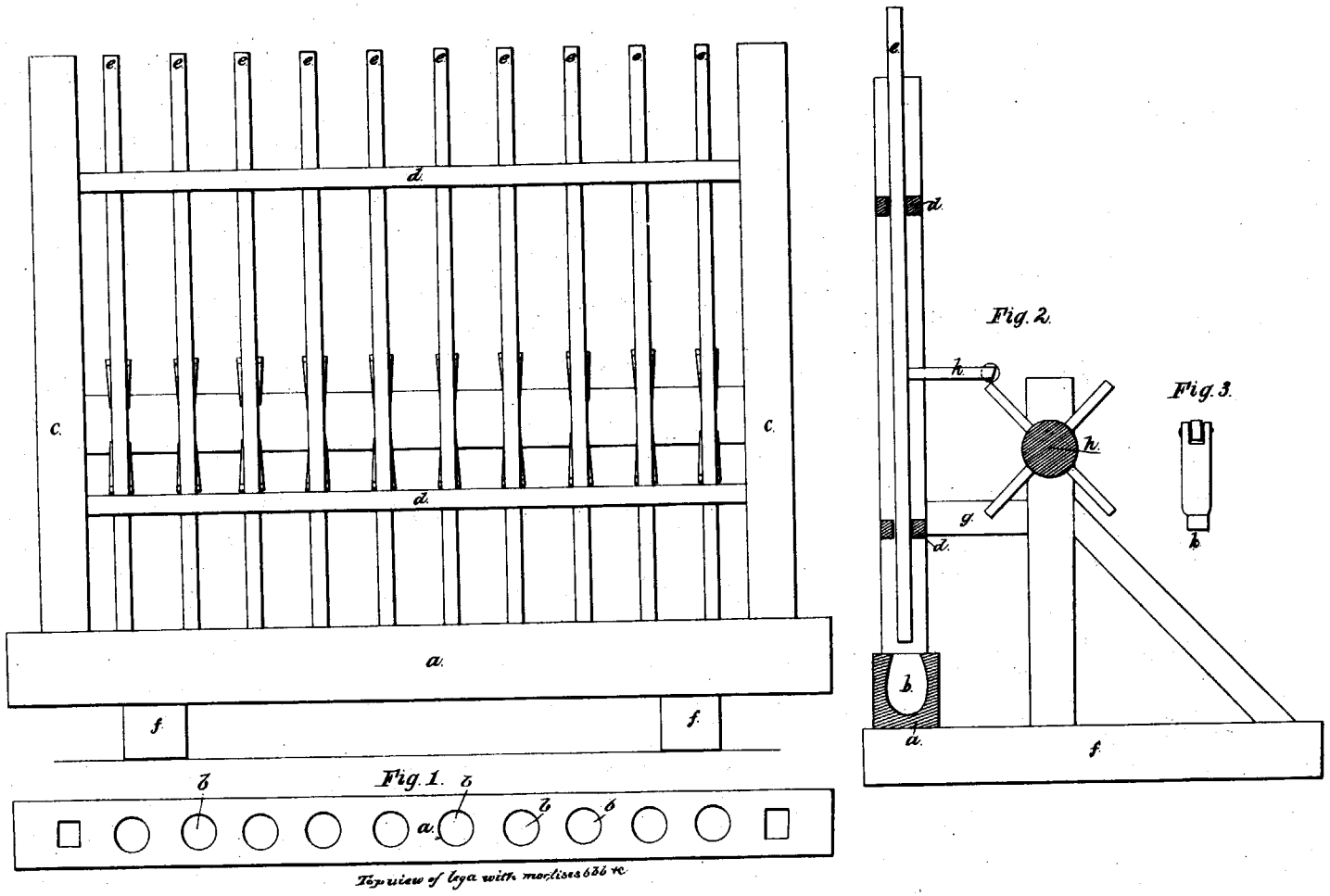
THE NORRIS PETERS CO., PHOTO-LITHO., WASHINGTON, D. C.

Sept. 5. 1834

Henry Handschy, of Muskingum Co. Ohio 8396X

Letters Patent

The schedule referred to in these Letters Patent and making part of the same, containing a description in the words of the said Henry Handschy himself, of his improvement being a machine for the purpose of shelling barley for cooking and table use –

---

To all to whom these presents shall come: Be it known that I, Henry Handschy, in the County of Muskingum, in the State of Ohio, have invented a new & useful machine for the purpose of shelling barley for cooking and table use, and that the following is a full description of the construction and operation of said machine, as invented by me –

1st A square log 14 inches, with mortices 14 inches from centre to centre apart the mortices to be six inches on the top, 12 inches deep, hollowed in the middle in a pot form, nine inches – 2nd Two upright posts 10 inches square, 10 feet long, framed into the mortice log – 3rd two braces, 10 by 4 inches, to be framed in the upright posts 2 feet from the bottom one, and the other 2 feet from the top, with mortices 3/4 inches, corresponding horizontally with the mortices in the bottom log – 4th Stampers 10 feet long, 3 inches square, to go in the mortices – 5th arms 13 inches long, 2 by 4, to be morticed in the middle of the stampers – 6th two bottom sills 12 inches square, 8 feet long, on which the above machine is placed, 2 feet from one end.

7th two posts, 10 inches square, 6 feet long, morticed into the bottom sills 20 inches from the stampers, with two braces on each side connecting the two posts together – 8th a welbeam 12 inches round, to be placed with gudgeons, on the posts centre bevel 3 inches below the arms of the stampers.

9th Arms in the welbeam, 13 inches long, 6 by 2, with forks and rollers, are morticed in the welbeam, corresponding with the stampers, four in a square form for each stamper – but where the motion is quick two or three may do – The length depends on the number of actions – I should recommend 10, which will make 16 feet, I started two, may the 10th last, which answer a good purpose which induced me to apply for a Patent –

The use of the foregoing machine is, to have the barley very dry or kiln dryed, to be put in the bottom mortices, in which it is shelled or hulled, but it must occasionally be taken out and separated from the husk with a cockle sieve; this is as near as can be, the description of the machine as invented by me.

Witnesses,
Wm. G. Rankin
Samuel Cabeer

Henry Handschy
Drawing

Exd.
W.C.

490.